United States Patent
Bahls et al.

(10) Patent No.: US 8,094,581 B2
(45) Date of Patent: Jan. 10, 2012

(54) METHOD FOR THE AUTOMATIC CONFIGURATION OF COMMUNICATION RELATIONSHIPS BETWEEN COMMUNICATION UNITS SITUATED IN A PACKET-ORIENTED COMMUNICATIONS NETWORK

(75) Inventors: Thomas Bahls, Greifswald (DE); Frank Präger, Greifswald (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1281 days.

(21) Appl. No.: 10/536,065

(22) PCT Filed: Nov. 25, 2003

(86) PCT No.: PCT/DE03/03898
§ 371 (c)(1),
(2), (4) Date: May 24, 2005

(87) PCT Pub. No.: WO2004/049629
PCT Pub. Date: Jun. 10, 2004

(65) Prior Publication Data
US 2006/0045079 A1  Mar. 2, 2006

(30) Foreign Application Priority Data
Nov. 26, 2002 (DE) .................. 102 55 159

(51) Int. Cl.
*H04L 12/28* (2006.01)
(52) U.S. Cl. ......... 370/254; 370/252; 370/445; 370/457
(58) Field of Classification Search .................. 370/338, 370/254, 389, 393
See application file for complete search history.

(56) References Cited

U.S. PATENT DOCUMENTS

| | | | | |
|---|---|---|---|---|
| 5,303,235 A | * | 4/1994 | Chan et al. | 370/254 |
| 5,684,796 A | * | 11/1997 | Abidi et al. | 370/389 |
| 5,903,561 A | * | 5/1999 | Kwon | 370/382 |
| 5,926,463 A | * | 7/1999 | Ahearn et al. | 370/254 |
| 6,166,653 A | * | 12/2000 | Schulmeyer et al. | 340/9.16 |
| 6,377,990 B1 | | 4/2002 | Slemmer et al. | |
| 6,516,345 B1 | * | 2/2003 | Kracht | 709/220 |
| 7,139,839 B2 | * | 11/2006 | White et al. | 709/245 |
| 7,330,435 B2 | * | 2/2008 | Guerin et al. | 370/238 |
| 7,359,340 B2 | * | 4/2008 | Duranton | 370/256 |

(Continued)

FOREIGN PATENT DOCUMENTS

DE    693 29 497 T2    6/1995

(Continued)

*Primary Examiner* — Michael J Moore, Jr.
(74) *Attorney, Agent, or Firm* — Laurence A. Greenberg; Werner H. Stemer; Ralph E. Locher

(57) ABSTRACT

In the inventive configuration of a communication relationship, a data packet includes the respective address information of the communication unit is generated by at least one remote communication device or by at least one communication unit that is assigned to the device and is transmitted to a central communication device via a communication network. The central communication device selects an assigned communication unit and generates a data packet, which includes the respective address information of the selected communication unit, the data packet being transmitted to the remote communication device. The communication relationship between the addressed communication units is configured with the aid of the transmitted or exchanged address information via the communications network. The inventive method can be advantageously used during the initialization of a communications network, e.g. a booting of the system, as no communication with a management system (central or remote) is possible during this period.

18 Claims, 2 Drawing Sheets

U.S. PATENT DOCUMENTS

| | | | |
|---|---|---|---|
| 7,599,284 B1 * | 10/2009 | Di Benedetto et al. | 370/216 |
| 7,756,129 B2 * | 7/2010 | Donaghey | 370/389 |
| 2002/0120720 A1 | 8/2002 | Moir | |
| 2004/0081104 A1 * | 4/2004 | Pan et al. | 370/254 |

FOREIGN PATENT DOCUMENTS

| | | |
|---|---|---|
| EP | 1 059 767 A2 | 12/2000 |
| WO | WO 01/19080 A2 | 3/2001 |

* cited by examiner

METHOD FOR THE AUTOMATIC CONFIGURATION OF COMMUNICATION RELATIONSHIPS BETWEEN COMMUNICATION UNITS SITUATED IN A PACKET-ORIENTED COMMUNICATIONS NETWORK

CROSS REFERENCE TO RELATED APPLICATIONS

This application is the US National Stage of International Application No. PCT/DE2003/003898, filed Nov. 25, 2003 and claims the benefit thereof. The International Application claims the benefits of German application No. 10255159.6 filed Nov. 26, 2002, both applications are incorporated by reference herein in their entirety.

FIELD OF THE INVENTION

The invention relates to a method for the automatic configuration of communication relationships between communication units situated in a packet-oriented communications network.

SUMMARY OF THE INVENTION

In the interests of optimizing current communications networks, in particular broadband subscriber access networks (also called access networks), a large number of subscribers are to be guaranteed low-cost access to both narrowband and broadband services—e.g. video-on-demand. In the course of this optimization, the technological and economical cost of implementing network devices that can be situated in current communications networks may be reduced by using technologies that have not been specifically developed for broadband subscriber access networks, but for mass markets (e.g. personal computers). An example of such a widespread and correspondingly further developed technology is the "Ethernet", which has been standardized according to IEEE standard 802.3 and which provides a frame-oriented or packet-oriented and connectionless transmission method. In network devices that can be situated in current communications networks, such as—for example—multiplex devices, it is known for data cells, for example those configured according to asynchronous transfer mode (ATM)—also called ATM cells—as well as time-slot-oriented information (e.g. TDM or PCM structures, Pulse Code Modulation) to be switched, via an Ethernet situated locally in the network device, between remote subscriber line modules situated in the network device and at least one central unit or module having central functions. The Ethernet may be used both as a "wiring" or "backplane" in a card rack for bridging short distances, and as a comprehensive communications network for bridging larger distances.

In the transition from traditional, circuit-switching or time-slot-oriented communications networks to packet-oriented communications networks, particularly on communications networks according to IEEE standard 802.3, the change in transmission method also entails changes in the addressing and configuration of the system components involved. The following system structure is frequently used in current communications networks:

a central module—hereinafter also called a central communication device—with a plurality of assigned communication units providing Ethernet interfaces, for example—hereinafter also called transformer modules—which are connected via a central switching device—e.g. Ethernet switch—to a packet-oriented communications network—e.g. Ethernet, a plurality of remote modules—hereinafter also called remote communication devices—each of which likewise incorporates at least one communication unit providing an Ethernet interface—a transformer module—in which at least one communication unit is connected via a switching device—in this case an Ethernet switch—to the communications network, and—via said communications network—to the central communication device.

In the system structure described above, the object is to facilitate a functional startup of the arrangement or system—i.e. to boot it up—in such a way that a logical point-to-point connection is set up between communication units or transformer modules assigned in each case to a remote module and to the central module.

A conventional solution option consists in setting up the individual configuration of the respective point-to-point connections via the communications network by means of local management consoles that can be connected to the communication devices. However, in a system covering a large geographical area, with many remote communication devices, this cannot be done by network operators due to the increased cost. The alternative option of having a fixed configuration is likewise not possible, since the assignment is to be effected dynamically.

The object of the invention is to improve the configuration of communication relationships between central and remote communication devices situated in a communications network, such that no interaction with a central management system is necessary. This object is achieved by the claims.

In the inventive method, communication relationships are configured between communication units situated in a packet-oriented communications network, assigned to at least one remote and one central communication device, and in each case having communications-network-specific address information. The main aspect of the method according to the invention consists in that a data packet comprising the respective address information of the communication unit is generated by at least one remote communication device or by at least one communication unit that is assigned to said device and is transmitted to the central communication device via the communications network. Said central communication device identifies the address information contained in the incoming data packet, selects at least one communication unit assigned to the central communication device, and assigns the identified address information to the selected communication unit. Furthermore, said central communication device—or at least one selected communication unit—generates at least one data packet which comprises the respective address information of the selected communication unit, and transmits said data packet to the remote communication device via the communications network. The communication relationship between the addressed communication units is configured via the communications network with the aid of the address information transmitted to the central and remote communication device.

The main advantage of the inventive method consists in that no management system (central or remote) is required for the setting up or configuration of communication relationships between communication units—e.g. interface units or transformer modules—situated in a communications network. The inventive method can therefore be used during the initialization of a communications network, e.g.—a system booting, as no communication with a central management system is possible during this period.

Only after these communication relationships have been set up according to the inventive method is it possible, for example, for the management system to communicate via the communications network via the communication relationships that have been set up. The inventive method makes it possible, at the earliest possible stage during system initialization, for the communication units or modules involved in a communication relationship that is to be set up, to be notified of the respective reciprocal communications-network-specific address information—also called MAC addresses—at runtime, thus facilitating a random assignment for the point-to-point connections.

The packet-oriented communications network is advantageously configured according to the IEEE standard 802.3. Such communications networks that are based on Ethernet technology are designed for the mass market in local networks (LANs) and are therefore low-cost. With the aid of Ethernet technology, therefore, internally situated communications networks can be used, for example locally in a network device, as cost—effective wiring of—for example—central and remote modules ("backplane").

Other advantageous embodiments of the inventive method and a communication arrangement for implementing the inventive method are described in the dependent claims.

The inventive method is described in greater detail below with the help of two drawings.

DETAILED DESCRIPTION OF THE INVENTION

Figure 1:
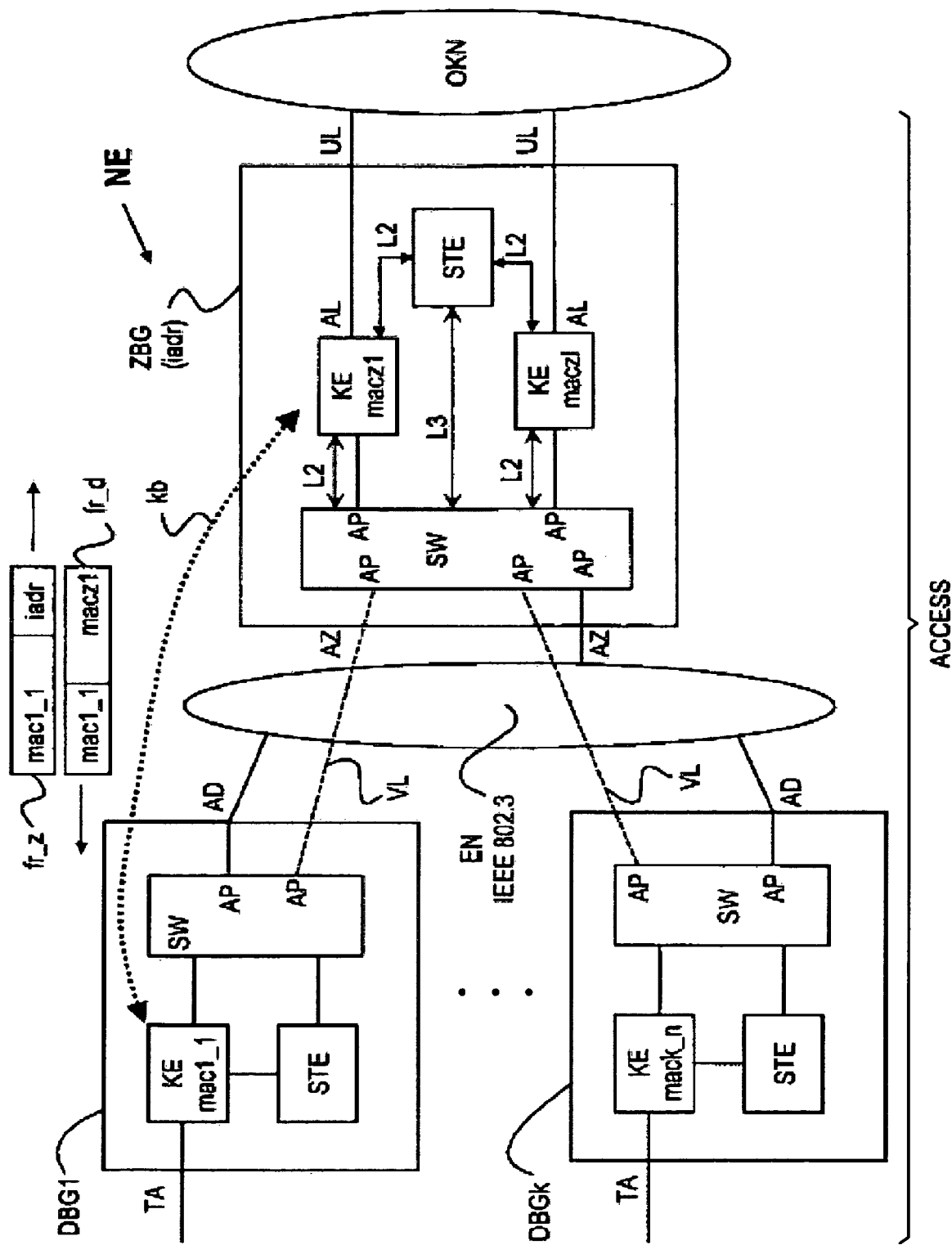
FIG. 1 shows a communication arrangement, situated in a communications network, for implementing the inventive method.

FIG. 1 is a block circuit diagram showing a network device NE that is situated in a subscriber access network or access network ACCESS and configured as a multiplex device, and in which the respective subscribers—not shown—are connected to a higher-level communications network OKN—for example an ISDN communications network—via a plurality of remote modules DBG . . . k situated in the network device NE and via a plurality of subscriber accesses TA or subscriber access lines. An "internal", packet-oriented communications network EN—hereinafter also called "Ethernet"—which is configured according to IEEE standard 802.3, and via which the respective remote modules DBG1 . . . k—hereinafter also called remote communication devices—are connected to a central module ZBG—hereinafter also called a central communication device—is situated in the network device NE. The remote communication devices DBG1 . . . k and the central communication device ZBG each have a switching device SW—hereinafter called the Ethernet switch—which has been adapted to the transmission technology of the communications network EN, whereby said communications devices DBG1 . . . k, ZBG are connected to the packet-oriented communications network EN via a connection port of the Ethernet switch SW and a connection AD, AZ of the respective communication device DBG1 . . . k, ZBG, said connection being provided for this purpose.

In this exemplary embodiment, each remote communication device DBG1 . . . k has a communication unit KE represented by a transformer module KE. Each transformer module KE implementing the subscriber access incorporates transformation functions for the transition between—for example—time-slot-oriented transmission technology that is implemented on the subscriber access line, and packet-oriented transmission technology—in this case TCM/Ethernet—that is implemented in the communications network. Each transformer module KE is connected to the Ethernet switch SW assigned in the remote communication device DBG1 . . . k. It should be noted that each remote communication device DBG1 . . . k may comprise a plurality of such transformer modules or communication units KE.

It should also be noted, in the event that only one communication unit KE is assigned to the remote communication device DBG1 . . . k, that the remote communication device DBG1 . . . k and the assigned communication unit may be logically combined, in other words may be regarded as an identical or logically related unit.

Furthermore, a plurality of transformer modules or communication units KE, which are each connected to the Ethernet switch SW situated in the central module ZBG, are likewise situated in the central communication device ZBG. All communication units KE have their own address information mac1_1 . . . k_n, maczl . . . 1—also called a MAC address (Medium Access Control)—which uniquely identifies the respective communication unit KE in the packet-oriented communications network EN. Each communication device DBG1 . . . k, ZBG that is connected to the packet-oriented communications network EN has a control device STE, which is connected to the components of the respective communication device—and therefore to the respective transformer modules KE and the Ethernet switch SW. The transformer modules KE situated in the central communication device ZBG each have a connection AL, via which the respective transformer modules KE are connected to the higher-level communications network OKN that is configured—in this exemplary embodiment—according to the ISDN transmission method, via corresponding outputs UL in the central communication device ZBG.

Figure 2:
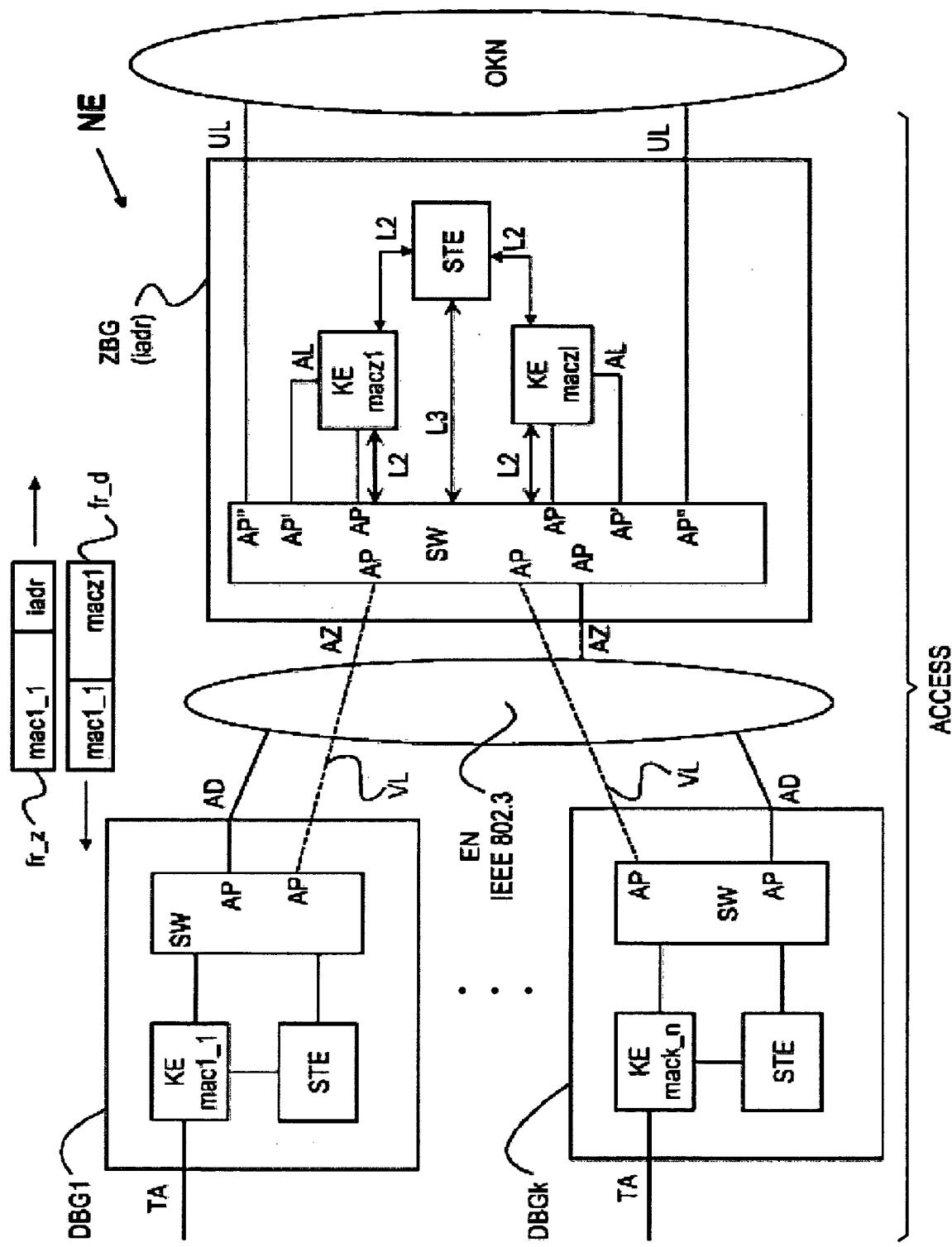
FIG. 2 shows an alternative development version of the communication arrangement shown in FIG. 1.

According to an alternative development version illustrated in FIG. 2, the outputs AL of the transformer modules KE situated in the central communication device ZBG are taken back to corresponding ports AP' of the Ethernet switch SW situated in the central module ZBG, said Ethernet switch SW being connected to the higher-level communications network OKN via further ports AP". The corresponding configuration transmits information between the transformer modules (KE) and the higher-level communications network (OKN) via the Ethernet switch SW and its connections AP', AP" respectively.

When the arrangement illustrated in the block circuit diagram is started up, communication relationships or logical point-to-point connections, via which the payload information is transmitted following successful startup, are to be set up between the communication units KE situated in the remote and central communication devices.

The sequence of the inventive method is described in greater detail below:

1. In one development version of the inventive method, a freely selectable MAC address iadr—hereinafter also called the initialization address—is defined as being known to all control units STE situated in the respective remote and central communication devices DBG1 . . . k, ZBG. The time of initialization of the communication arrangement illustrated in the block circuit diagram, also called the system start-up or boot, is considered below. After the initialization of the system or of the communication arrangement, all communication devices DBG1 . . . k, ZBG connected to the packet-oriented communications network EN behave passively. For the exemplary embodiment, it may also be assumed that—during the system initialization—a communication relationship or logical point-to-point connection kb (many such connections are signified in the block circuit diagram by a dotted double-ended arrow) is to be set up between the transformer module KE situated in the first communication device DBG1 and a transformer module KE situated in the central communication device ZBG.

2. The control device STE situated in the first remote communication device DGB1 configures the initialization address iadr as a (temporary) destination MAC address in the communication unit KE assigned to said device. This initialization address iadr is also configured in the assigned Ethernet switch in such a way that the connection port AP that implements the connection to the communications network EN is selected on the network side by said initialization address iadr. Furthermore, all units situated in the communications network EN, such as—for example—switches, are configured by presetting them so that the data packets or Ethernet frames having the initialization address iadr are switched toward the central communication device.

3. The control unit STE situated in the central communication device ZBG configures the initialization address iadr in the relevant Ethernet switch SW as pertaining to precisely one respective output port AP assigned to precisely one transformer module KE, so that a unique switching decision can be made immediately without "flooding" or "learning". Two development versions are possible according to this exemplary embodiment: firstly, an incoming data packet or Ethernet frame that has the initialization address iadr as the destination address is switched via the transformer module KE and via an interface to the control unit STE, said interface being provided for this purpose, as indicated in the block circuit diagram by the route L1, L2. In the other version, an Ethernet frame having the initialization address iadr is switched via an interface of the Ethernet switch SW—said interface being specially provided for this purpose—directly to the control unit STE—as indicated in the block circuit diagram by the route L3.

4. After the initialization according to step 2, the transformer module KE in the first remote communication device DBG1 starts to transmit special data packets or Ethernet frames—illustrated schematically in the block circuit diagram by a data packet fr_z—cyclically to the initialization address iadr. These Ethernet frames fr_z may, for example, be configured such that they differ somehow from a normal payload and can therefore be clearly identified as a "handshake". This may be achieved, for example, by setting a specific value of the "Ethernet type field" defined in the Ethernet standard. Unlike the values already provided or reserved in the standard, this value may be freely selected. Furthermore, the MAC address—in this case mac1_1—of the transformer module KE is inserted in the generated Ethernet frames fr_z as the "originating address".

5. The Ethernet switch SW situated in the first remote communication device DGB1 forwards the data packet fr_z thus generated to the Ethernet EN via the connection port AP, since this switching decision is clear as a result of step 2.

6. The data packet fr_z switched to the central module ZBG via the communications network EN is received by the Ethernet switch SW situated in the central communication device ZBG, whereby the originating address mac1_1 contained in the received data packet fr_z is identified or "learnt" and a unique switching decision is likewise made by the Ethernet switch SW on the basis of the configuration described in step 3. The received data packet is forwarded to the control device STE of the central communication device ZBG via one of the configured connection ports AP, either via the illustrated route L1, L2 or via the alternative route L3, depending on the version selected.

7. The control device STE situated in the central communication device ZBG extracts from the received data packet or Ethernet frame fr_z the originating MAC address (in this case mac1_1) contained in it, and selects a transformer module KE that is currently unassigned and available in the central communication device ZBG. For this exemplary embodiment it must be assumed that the transformer module KE with the corresponding MAC address macz1 is selected. The control device STE implements the extracted originating MAC address (mac1_1) in the selected transformer module KE (maczl) as the destination for the transmit direction of the point-to-point connection to be set up. The control device STE also determines the MAC address of the selected transformer module (in this case macz1), which in turn must be communicated to the first remote communication device DBG1 as the (ultimate) destination.

8. The control device STE situated in the central communication device ZBG generates (for example via the route L3 illustrated in the block circuit diagram) an equally "special" Ethernet frame as the response to the Ethernet frame emitted by the remote communication device DBG1. The destination of this special Ethernet frame or data packet schematically illustrated in the block circuit diagram by a data packet fr_d—is the first remote communication device DBG1, or the communication unit or transformer module KE (mac1_1) assigned to said remote communication device DBG1—i.e. the MAC address mac1_1 that has just been learnt is inserted in the generated Ethernet frame fr_d as destination information. Furthermore, the originating MAC address of the transformer module (in this case macz1) selected in step 7 is inserted in the special Ethernet frame fr_d as the originating address. All Ethernet switches SW affected have learnt the MAC address of the transformer module KE assigned to the first remote communication device DBG1 and are able to make a unique switching decision for the return route.

9. The Ethernet switch SW situated in the first remote communication device DBG1 extracts from this received data packet or response Ethernet frame fr_d in a similar way to step 3. In this way the control device STE can extract the originating MAC address contained in the Ethernet frame and configure it as the ultimate destination of the point-to-point connection kb to be set up or configured in the transformer module KE assigned to it.

10. The transformer module KE situated in the first remote communication device DGB1 stops the cyclical emission of Ethernet frames fr_z according to step 4, so that the transportation of the actual payload via the communication device kb, that was set up with the aid of the inventive method, may now commence.

According to an alternative development version of the communication arrangement illustrated in the block circuit diagram, the respective remote communication devices DBG1 . . . k can each be connected to the central communication device ZBG via a connection line implementing the communications network EN, said connection line VL being indicated in the block circuit diagram by a dotted line. All data packets emitted by the remote communication devices DBG1 . . . k are automatically switched or routed to the central communication device ZBG via these connection lines VL. It should be noted that the random MAC address or initialization address iadr previously provided for the inventive method is not required in an arrangement of this type, since all data packets are switched or transmitted to the central communication device ZBG from the remote communication devices DBG1 . . . k via the connection lines without switching decisions, and therefore the initialization address is not required as destination information or routing information for the Ethernet frames. In this development version, therefore, only the MAC addresses of the respective transformer modules KE that represent the end points of the point-to-point connections to be set up—i.e. mac1_1 . . . k_n, maczl . . . l—are inserted and transmitted in the described way. The non-use of routing information in Ethernet frames would not, however, conform to the standard (e.g. as per IEEE 802.3), which means that the inventive method could not be implemented with standard-compliant components. A proprietary adaptation—which is associated with higher cost—would be required, while it is nevertheless possible, in this development version, to dispense with any type of management (central or remote).

The inventive method enables a system configuration to be configured and booted up dynamically without the involvement of a central management system. The method described in greater detail in the exemplary embodiment uses only resources that comply with the Ethernet standard and manages without broadcasts, which—for reasons of clear data separation—is regarded as unsuitable, particularly in the context of communications networks being operated by different network operators. With the exception of the development version described above, the inventive method requires a unique MAC address or initialization address, which is fixed yet freely selectable, in order to configure an essentially unlimited quantity of point-to-point connections.

The invention claimed is:

1. A method for configuring communication relationships between communication units arranged in a packet-oriented communications network during initialization of the network, wherein the communications units are assigned to a remote and a central communication device, the remote and the central communication devices each having a switching device, and wherein each communication unit has a communications-network-specific address information, the method comprising:

providing a freely selectable temporary initialization address that uniquely addresses the central communication device in the communications network;

configuring the switching devices so that data packets having the initialization address are switched toward the central communication device;

generating a data packet by the remote communication device or by a communication unit assigned to the remote communication device, wherein the data packet comprises the address information of the remote communication unit;

transmitting the data packet to the central communication device via the communications network wherein the data packet is switched via the communications network with the help of the initialization address;

identifying the address information included in the data packet by the central communication device;

selecting a communication unit assigned to the central communication device by the central communication device;

assigning the identified address information to the selected communication unit by the central communication device;

generating a further data packet by the central communication device or the selected communication unit, wherein the further data packet comprises the address information of the selected communication unit;

transmitting the further data packet to the remote communication device via the communications network by the central communication device or the selected communication unit wherein the further data packet is switched via the communications network to the remote communication device with the help of the inserted address information; and configuring the communication relationship between the communication unit assigned to the remote communication device and the selected communication unit via the communications network based on the address information included in the data packet and the further data packet.

2. The method according to claim 1, wherein the initialization address is inserted as destination information in the data packet to be transmitted to the central communication device.

3. The method according to claim 1, wherein the address information that is identified and is assigned to the selected communication unit is inserted as destination information in the further data packet to be transmitted to the remote communication device.

4. The method according to claim 2, wherein the address information that is identified and is assigned to the selected communication unit is inserted as destination information in the further data packet to be transmitted to the remote communication device, and wherein the further data packet is switched via the communications network to the remote communication device with the help of the inserted address information.

5. The method according to claim 1, wherein the address information of the selected communication unit is inserted as the originating address in the further data packet to be transmitted to the remote communication device.

6. The method according to claim 2, wherein the address information of the selected communication unit is inserted as the originating address in the further data packet to be transmitted to the remote communication device.

7. The method according to claim 3, wherein the address information of the selected communication unit is inserted as the originating address in the further data packet to be transmitted to the remote communication device.

8. The method according to claim 1, wherein the remote communication device is connected to the central communication device via at least one connection line implementing the communications network.

9. The method according to claim 2, wherein the remote communication device is connected to the central communication device via at least one connection line implementing the communications network.

10. The method according to claim 3, wherein the remote communication device is connected to the central communication device via at least one connection line implementing the communications network.

11. The method according to claim 5, wherein the remote communication device is connected to the central communication device via at least one connection line implementing the communications network.

12. The method according to claim 1, wherein the communications network is configured as a frame-oriented or packet-oriented communications network according to IEEE standard IEEE 802.3.

13. The method according to claim 1, wherein the central communication device and the remote communication device each comprises a switching unit configured according to IEEE standard 802.3, via which the communication units that are respectively assigned to the communication devices are connected to the communications network.

14. The method according to claim 1, wherein the configured communication relationship comprises one or more logical point-to-point connections.

15. A communication arrangement for the configuration of communication relationships between communication units arranged in a packet-oriented communications network during initialization of the network, comprising:
communication units situated in a packet-oriented communications network; and
at least one remote communication device and one central communication device assigned to the communication units, the remote communication device and the central communication device each having a switching device, wherein
each of the communication units has communications-network-specific address information,
the at least one remote communication device or at least one communication unit assigned to the remote communication device, includes first mechanisms for generating at least one data packet having the address information of the respective remote communication unit, and for forwarding the at least one generated data packet to the communications network, and
the central communication device and/or at least one communication unit assigned to the central communication device includes second mechanisms for identifying the address information included in at least one received data packet, and for selecting at least one communication unit assigned to the central communication device, and for assigning the identified address information to the selected communication unit, and for generating at least one further data packet having the address information of the respective selected communication unit, and for transferring the generated further data packet to the at least one remote communication device via the communications network,
the first and second mechanisms are configured such that, with the assistance of the address information transmitted to the central and the remote communication device, the communication relationship between the communication unit assigned to the remote communication device and the selected communication unit is configured via the communications network, and
a freely selectable temporary initialization address is used to uniquely address the central communication device in the communications network,
the at least one data packet is switched via the communications network with the help of the selectable initialization address, and
the at least one further data packet is switched via the communications network to the remote communication device with the help of the inserted address information.

16. The communication arrangement according to claim 15, wherein the at least one remote communication device, the central communication device, and the communications network are part of a network device arrangeable in a higher-level or superordinate communications network.

17. The communication arrangement according to claim 16, wherein the at least one remote communication device and the central communication device are configured as modules situated in the network device.

18. A method for configuration of communication relationships between communication units situated in a packet-oriented communications network during initialization of the network, the method comprising:
providing communication units situated in a packet-oriented communications network;
assigning the communications units to at least one remote communication device and to one central communication device, each having communications-network-specific address information;
providing the remote communication device with a switching device and providing the central communication device with a switching device;
configuring the switching device in the remote communication device and the switching device in the central communication device so that data packets having the initialization address are switched toward the central communication device;
providing a freely selectable temporary initialization address that uniquely addresses the central communication device in the communications network;
generating a first data packet comprising an address information of a remote communication unit assigned to the remote communication device by the remote communication device or by the communication unit assigned to the remote communication device;
transmitting the first data packet to the central communication device via the communications network, wherein the first data packet is switched via the communications network with the help of the selectable initialization address;
identifying the address information, selecting at least one communication unit assigned to the central communication device, and assigning the identified address information to the selected at least one communication unit, by the central communication device; and
generating a second data packet comprising an address information of the selected communication unit, and transmitting the second data packet to the at least one remote communication device via the communications network, by the central communication device or the at least one selected communication unit, wherein a communication relationship between the communication unit assigned to the remote communication device and the selected communication unit is configured via the communications network based on the address information transmitted to the central and the at least one remote communication device.

* * * * *